3,481,932
2-ANILINO-5-METHYL-6-PHENYLPYRIMIDINES
AND CONGENERS
Hans A. Wagner, Skokie, Ill., assignor to G. D. Searle &
Co., Chicago, Ill., a corporation of Delaware
No Drawing. Filed Sept. 1, 1967, Ser. No. 664,911
Int. Cl. C07d 5/42; A61k 27/00
U.S. Cl. 260—256.4                                    3 Claims

ABSTRACT OF THE DISCLOSURE

Preparation of the captioned compounds, which are substituted in the 4-position by halogen or an azido or amino radical, and their valuable pharmacological properties, including anti-hypercholesterolemic, anti-protozoal, and anti-inflammatory activities, are disclosed.

---

This invention relates to 2-anilino-5-methyl-6-phenylpyrimidines and congeners. More particularly, this invention provides new, useful, and unobvoius chemical compounds of the formula

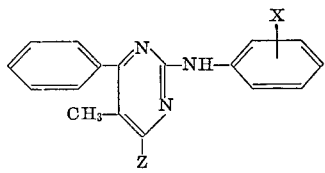

wherein X represents hydrogen or halogen and Z represents halogen or an azido or amino radical.

The halogens represented by X and Z can be any of fluorine, chlorine, bromine, or iodine, albeit chlorine is a preferred embodiment of Z.

The compounds to which this invention relates are useful because of their valuable pharmacological properties. Thus, for example, they are anti-hypercholesterolemic, anti-inflammatory, and adapted to retard or prevent the growth of protozoa such as *Tetrahymena gelleii*.

The anti-hypercholesterolemic utility of the instant compounds is evident from the results of a standardized test for their capacity to counteract the increased plasms cholesterol induced in rats by the injection of Triton WR–1339 and described by Garattini et al. in "Drugs Affecting Lipid Metabolism," pp. 150 ff., Elsevier, 1961. A group of 8 males rats each weighing approximately 250 gm. is used for each compound tested. Dosages 50 mg./kg. dissolved or suspended in 10 ml./kg. of an aqueous 4% solution of the Triton and administered intraperitoneally. A corresponding group of 8 rats each concurrently injected intraperitoneally with 10 ml./kg. of aqueous 4% Triton WR–1339 containing no compound serves as controls. Exactly 18 hrs. after injection the animals are anesthetized, whereupon blood samples are taken from the abdominal aortas and analyzed for cholesterol. A compound is considered anti-hypercholesterolemic if it significantly (T≦0.05) decreases the mean cholesterol analysis relative to the control value. When 4 - chloro - 2 - (p - chlorophenylamino)-5-methyl-6-phenylpyrimidine, the representative product of Example 5 hereinafter, was tested by this procedure the results were as shown in Table I.

TABLE I

Product _____ Ex. 5.
Percent decrease _____ 36.
Conclusion _____ Anti-hypercholesterolemic.

The anti-inflammatory activity of the compounds hereof is evident from the results of a standardized test for their capacity to inhibit the edema induced in rats by injection of carrageenin. The procedure is a modification of one described by Winter et al., Proc. Soc. Exper. Biol. and Med., 111, 544 (1962). Compound is administered subcutaneously or intragastrically, dissolved or suspended in 0.5 ml. of aqueous 0.86 sodium chloride, propylene glycol, a mixture of these vehicles, or corn oil, to each of 10 male rats weighing 100–130 gm. A like group of rats to which is identically and concurrently administered vehicle alone serves as controls. Precisely 1 hr. later, each animal is injected under the plantar surface of each hind foot with 0.1 ml. of an aqueous 1% solution of carrageenin (Marine Colloids, Inc., Type 402). A compound is considered anti-inflammatory if the average total circumference (T) of the 2 hind feet treated therewith, which is measured in arbitrary units 5 hrs. after the carrageenin injection, is significantly (P ≦0.05) less than the corresponding value (C) for the control group. Results of the testing of 4-chloro-2-(p-chlorophenylamino)-5-methyl-6-phenylpyrimidine by this procedure are set forth in Table II.

TABLE II

Product _____ Ex. 5.
Dose _____ 25 mg.
Route _____ subcut.
C _____ 104.0.
T _____ 98.7.
C–T _____ 5.3.
Conclusion _____ Anti-inflammatory.

The anti-inflammatory activity of the subject compounds is surprising in view of the fact that a 4-hydroxy analog, 2 - (p - chlorophenylamino) - 5-methyl-6-phenyl-4-pyrimidinol, the precursor of the product of Example 5 hereinafter, produced no significant response under identical test conditions. Further emphasizing the unexpectedness of the present invention is the publication of Curd et al. in J. Chem. Soc., 1946, 378 (cf. U.S. 2,433,440) disclosing the 5-desmethyl analog of the product of Example 1B hereinafter as an intermediate to a group of antimalarials concerning which it was concluded (p. 379) that a 6-phenyl substituent leads to product "practically devoid" of activity and (p. 381) the presence of a 5-substituent is not advantageous.

Those skilled in the art will recognize that observations of activity in standardized tests for particular pharmacological effects are fundamental to the development of valuable new drug products, both veterinary and human.

Preparation of the claimed compounds proceeds by heating 2-ethylthio-5-methyl-6-phenyl-4-primidinol with an appropriate amine

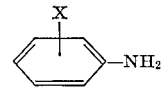

in 2-ethoxyethanol to give the aminopyrimidine

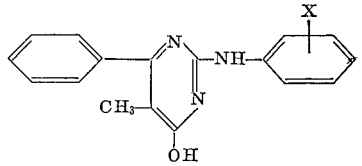

(X in the preceding two formulas being defined as before) from which the corresponding 4-chloro compound eventuates on heating with phosphorus oxychloride. The chloro compound is converted to the 4-azido analog by heating with sodium azide in dimethyl sulfoxide, and the azido compound affords the 4-amino analog upon hydrogenation at 1 atmosphere in dioxane solution, using 5% palladium-on-charcoal as a catalyst.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

(A) 2-anilino-5-methyl-6-phenyl-4-pyrimidinol

A mixture of 246 parts of 2-ethylthio-5-methyl-6-phenyl-4-pyrimidinol and 93 parts of aniline in 1000 parts of 2-ethoxyethanol (Cellosolve) is heated at the boiling point under reflux for 48 hours, whereupon solvent is removed by vacuum distillation. The residue is 2-anilino-5-methyl-6-phenyl-4-pyrimidinol.

(B) 2-anilino-4-chloro-5-methyl-6-phenylpyrimidine

A mixture of 15 parts of 2-anilino-5-methyl-6-phenyl-4-pyrimidinol and 70 parts of phosphorus oxychloride is heated at the boiling point under reflux for 40 min., then stirred into 1000 parts of ice. Stirring is continued for 30 min., whereupon the resulting mixture is neutralized with concentrated ammonium hydroxide. The solid precipitate thrown down is filtered off, washed with cold water, dried in air, and taken up in tetrahydrofuran. The tetrahydrofuran solution is dried over magnesium sulfate, filtered, and concentrated by vacuum distillation until the addition of ether induces crystallization. The crystals, filtered off and dried in air, are 2-anilino-4-chloro-5-methyl-6-phenylpyrimidine, having the formula

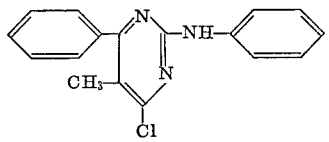

EXAMPLE 2

2-anilino-4-azido-5-methyl-6-phenylpyrimidine

A solution of 100 parts of 2-anilino-4-chloro-5-methyl-6-phenylpyrimidine and 26 parts of sodium azide in 700 parts of dimethyl sulfoxide is stirred at 70–80° for 5 hrs. then poured into 10,000 parts of water. The resultant mixture is stirred for 1 hr., whereupon insoluble solids are filtered off, washed with water, dried in air, and recrystallized from methanol to give 2-anilino-4-azido-5-methyl-6-phenylpyrimidine. The product has the formula

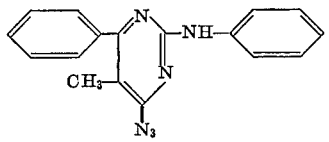

EXAMPLE 3

4-amino-2-anilino-5-methyl-6-phenylpyrimidine

To a solution of 5 parts of 2-anilino-4-azido-5-methyl-6-phenylpyrimidine in 100 parts of dioxan is added 1 part of 5% palladium-on-charcoal. The resultant mixture is agitated under 1 atmosphere of hydrogen at room temperature for 18 hrs. The catalyst is then filtered off and the dioxan removed by vacuum distillation, whereupon the residue is crystallized from a mixture of ether and n-pentane. The product thus obtained is 4-amino-2-anilino-5-methyl-6-phenylpyrimidine, having the formula

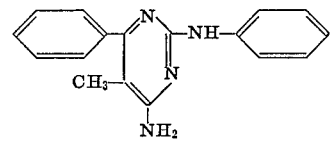

EXAMPLE 4

(A) 2-(o-fluorophenylamino)-5-methyl-6-phenyl-4-pyrimidinol

Substitution of 111 parts of o-fluoroaniline for the aniline called for in Example 1A affords, by the procedure there detailed, 2-(o-fluorophenylamino) - 5 - methyl-6-phenyl-4-pyrimidinol.

(B) 4-chloro-2-(o-fluorophenylamino)-5-methyl-6-phenylpyrimidine

Substitution of 15 parts of 2-(o-fluorophenylamino)-5-methyl-6-phenyl-4-pyrimidinol for the 2-anilino-5-methyl-6-phenyl-4-pyrimidinol called for in Example 1B affords, by the procedure there detailed, 4-chloro-2-(o-fluorophenylamino)-5-methyl-6-phenylpyrimidine, having the formula

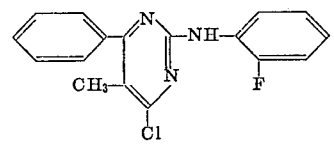

EXAMPLE 5

4-chloro-2-(p-chlorophenylamino)-5-methyl-6-phenylpyrimidine

Substitution of 15 parts of 2-(p-chlorophenylamino)-5-methyl-6-phenyl-4-pyrimidinol for the 2-anilino-5-methyl-6-phenyl-4-pyrimidinol called for in Example 1B affords, by the procedure there detailed, 4-chloro-2-(p-chlorophenylamino)-5-methyl-6-phenylpyrimidine melting at approximately 183–184°. The product has the formula

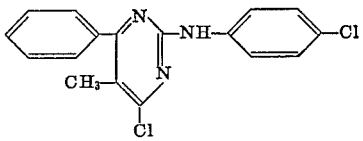

EXAMPLE 6

4-azido-2-(p-chlorophenylamino)-5-methyl-6-phenylpyrimidine

Substitution of 100 parts of 4-chloro-2-(p-chlorophenylamino)-5-methyl-6-phenylpyrimidine for the 2-anilino-4-chloro-5-methyl-6-phenylpyrimidine called for in Example 2 affords, by the procedure there detailed, 4-azido-2-(p-chlorophenylamino)-5-methyl-6-phenylpyrimidine melting at approximately 129–130°. The product has the formula

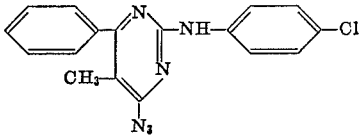

EXAMPLE 7

4-amino-2-(p-chlorophenylamino)-5-methyl-6-phenylpyrimidine

Substitution of 5 parts of 4-azido-2-(p-chlorophenylamino)-5-methyl-6-phenylpyrimidine for the 2-anilino-4-azido-5-methyl-6-phenylpyrimidine called for in Example 3 affords, by the procedure there detailed, 4-amino-2-(p- chlorophenylamino)-5-methyl-6-phenylpyrimidine, melting at 159–161°. The product has the formula

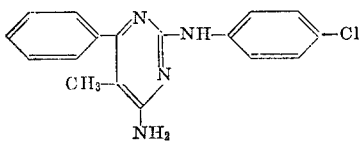

EXAMPLE 8

(A) 2-(m-bromophenylamino)-5-methyl-6-phenyl-4-pyrimidinol

Substitution of 172 parts of m-bromoaniline for the aniline called for in Example 1A affords, by the procedure there detailed, 2-(m-bromophenylamino)-5-methyl-6-phenyl-4-pyrimidinol.

(B) 2-(m-bromophenylamino)-4-chloro-5-methyl-6-phenylpyrimidine

Substitution of 15 parts of 2-(m-bromophenylamino)-5-methyl-6-phenyl-4-pyrimidinol for the 2-anilino-5-methyl-6-phenyl-4-pyrimidinol called for in Example 1B affords, by the procedure there detailed, 2-(m-bromophenylamino)-4-chloro-5-methyl-6-phenylpyrimidine. The product has the formula

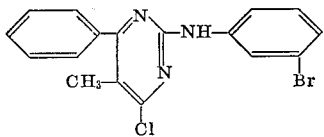

EXAMPLE 9

(A) 2-(p-iodophenylamino)-5-methyl-6-phenyl-4-pyrimidinol

Substitution of 219 parts of p-iodoaniline for the aniline called for in Example 1A affords, by the procedure there detailed, 2-(p-iodophenylamino)-5-methyl-6-phenyl-4-pyrimidinol.

(B) 4-chloro-2-(p-iodophenylamino)-5-methyl-6-phenylpyrimidine

Substitution of 15 parts of 2-(p-iodophenylamino)-5-methyl-6-phenyl-4-pyrimidinol for the 2-anilino-5-methyl-6-phenyl-4-pyrimidinol called for in Example 1B affords, by the procedure there detailed, 4-chloro-2-(p-iodophenylamino)-5-methyl-6-phenylpyrimidine. The product has the formula

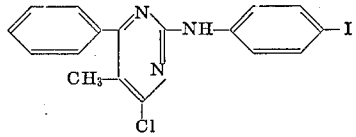

What is claimed is:
1. A compound of the formula

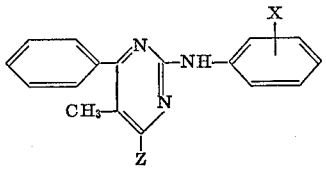

wherein X represents hydrogen or halogen and Z represents azido or amino.

2. A compound according to claim 1 which is 4-azido-2-(p-chlorophenylamino)-5-methyl-6-phenylpyrimidine.

3. A compound according to claim 1 which is 4-amino-2-(p-chlorophenylamino)-5-methyl-6-phenylpyrimidine.

References Cited

UNITED STATES PATENTS 2,740,785   4/1956   Rorig et al. _____ 260—256.4

ALEX MAZEL, Primary Examiner

R. J. GALLAGHER, Assistant Examiner

U.S. Cl. X.R.

424—251